(12) United States Patent
Jitkoff et al.

(10) Patent No.: US 8,443,297 B1
(45) Date of Patent: May 14, 2013

(54) DIMMING A WINDOW THAT IS OUT OF FOCUS

(75) Inventors: John Nicholas Jitkoff, Palo Alto, CA (US); Daniel T. Erat, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/525,172

(22) Filed: Jun. 15, 2012

(51) Int. Cl.
*G06F 3/048* (2006.01)

(52) U.S. Cl.
USPC ........... 715/795; 715/796; 715/790; 715/802; 715/803

(58) Field of Classification Search .................. 715/795, 715/796, 790, 802, 803
See application file for complete search history.

(56) References Cited

U.S. PATENT DOCUMENTS

| | | | | |
|---|---|---|---|---|
| 5,936,608 | A * | 8/1999 | Springer | 345/690 |
| 6,661,425 | B1 * | 12/2003 | Hiroaki | 345/629 |
| 6,801,811 | B2 * | 10/2004 | Ranganathan et al. | 700/22 |
| 6,912,664 | B2 * | 6/2005 | Ranganathan et al. | 713/320 |
| 7,620,905 | B2 | 11/2009 | Boss et al. | |
| 2001/0015718 | A1 * | 8/2001 | Hinckley et al. | 345/156 |
| 2003/0135288 | A1 * | 7/2003 | Ranganathan et al. | 700/22 |
| 2003/0146897 | A1 * | 8/2003 | Hunter | 345/102 |
| 2004/0233146 | A1 * | 11/2004 | Nguyen | 345/82 |
| 2004/0257316 | A1 * | 12/2004 | Nguyen | 345/87 |
| 2005/0160302 | A1 * | 7/2005 | Asakura et al. | 713/320 |
| 2005/0275651 | A1 * | 12/2005 | Plut | 345/211 |
| 2006/0015818 | A1 * | 1/2006 | Chaudhri et al. | 715/779 |
| 2006/0087502 | A1 * | 4/2006 | Karidis et al. | 345/211 |
| 2006/0101293 | A1 * | 5/2006 | Chandley et al. | 713/300 |
| 2006/0132474 | A1 * | 6/2006 | Lam | 345/204 |
| 2006/0250385 | A1 * | 11/2006 | Plut | 345/211 |
| 2006/0277469 | A1 * | 12/2006 | Chaudhri et al. | 715/709 |
| 2006/0294475 | A1 * | 12/2006 | Holecek et al. | 715/781 |
| 2007/0126729 | A1 * | 6/2007 | Yoon et al. | 345/211 |
| 2008/0218535 | A1 * | 9/2008 | Forstall et al. | 345/690 |
| 2010/0017721 | A1 * | 1/2010 | Williams et al. | 715/740 |
| 2010/0180228 | A1 * | 7/2010 | Ben-Harrush et al. | 715/803 |
| 2011/0181611 | A1 * | 7/2011 | Zhang et al. | 345/589 |
| 2012/0074870 | A1 * | 3/2012 | Huang et al. | 315/307 |
| 2012/0084723 | A1 * | 4/2012 | Reeves et al. | 715/802 |
| 2012/0185781 | A1 * | 7/2012 | Guzman et al. | 715/752 |

OTHER PUBLICATIONS

"WindowShade X—4.0.2 window shade, float on top, & minimize-in-place", Mac OS X—System Utilities, VersionTracker, last viewed on Sep. 6, 2011, retrieved from <http://web.archive.org/web/20061121711111/http://www.versiontracker.com/dyn/moreinfo/macosx/12243>.
"TrailFocus", Compiz Blog, Mar. 23, 2006, retrieved from <http://web.archive.org/web/20070528102039/http://compiz.blogspot.com/2006/03/trailfocus.html>.

* cited by examiner

*Primary Examiner* — Tuyetlien Tran
(74) *Attorney, Agent, or Firm* — McDermott Will & Emery LLP

(57) ABSTRACT

Systems and methods for bringing a window into focus are provided. In some aspects, a method includes providing for display of a first window and a second window in a user interface. The first window is in focus. The second window is not in focus. The method includes receiving a user input for bringing the second window into focus. The method includes brightening at least a dimmed portion of the second window in response to the user input for bringing the second window into focus. The method includes gradually dimming at least a visible portion of the first window in response to the user input for bringing the second window into focus. The method includes pausing the dimming, after expiration of a time period, of the at least the visible portion of the first window.

26 Claims, 6 Drawing Sheets

US 8,443,297 B1

DIMMING A WINDOW THAT IS OUT OF FOCUS

The subject technology generally relates to user interfaces in computer systems and, in particular, relates to dimming an window that is out of focus.

BACKGROUND

Oftentimes, a user of a computer implementing an operating system may have multiple windows open simultaneously. For example, a user may have a word processor window, a web browser window, and an email client window open simultaneously on the computer. One of the windows may be in focus while the other windows may be out of focus. The windows that are out of focus may include content which distracts the user from the window that is in focus. As the foregoing illustrates, an approach for allowing the user to direct his/her attention to the window that is in focus may be desirable.

The term "in focus" may refer to a window in a graphical user interface that is currently selected to receive input. Typically, focus may be withdrawn from a window by selecting another element or window to focus, for example, by using a mouse. Focus can change when a cursor is moved to a component that is out of focus, and the component that is out of focus is selected via the cursor, to bring the component that is out of focus into focus. A window that is in focus may be presented in a foreground of a display, while other windows and components may be presented behind the window that is in focus or adjacent to the window that is in focus. A window that is in focus may be, for example, an active window. A window that is out of focus may be, for example, an inactive window.

SUMMARY

The disclosed subject matter relates to a computer-implemented method for bringing a window into focus. The method includes the steps of: providing for display of a first window and a second window in a user interface, wherein the first window is in focus, and wherein the second window is not in focus; receiving a user input for bringing the second window into focus; brightening at least a dimmed portion of the second window in response to the user input for bringing the second window into focus; gradually dimming at least a portion of the first window in response to the user input for bringing the second window into focus, wherein the brightening of the at least the dimmed portion of the second window finishes earlier than the gradually dimming the at least the portion of the first window; and pausing the dimming, after expiration of a time period, of the at least the portion of the first window.

The disclosed subject matter further relates to a computer-readable medium. The computer-readable medium includes instructions which, when executed by a computer, cause the computer to implement a method for bringing a window into focus. The instructions include code for: receiving, within a user interface in which a first window is in focus and a second window is not in focus, a user input for bringing the second window into focus; brightening at least a dimmed portion of the second window in response to the user input for bringing the second window into focus; gradually dimming at least a visible portion of the first window in response to the user input for bringing the second window into focus, wherein the instructions to brighten the at least the dimmed portion of the second window finish execution earlier than the instructions to gradually dim the at least the visible portion of the first window; and pausing the dimming, after expiration of a time period, of the at least the visible portion of the first window.

The disclosed subject matter further relates to a system. The system includes one or more processors. The system also includes a memory. The memory includes instructions which, when executed by the one or more processors, cause the one or more processors to implement a method for bringing a window into focus. The instructions include code for: providing for display of a first window, wherein the first window is in focus; receiving a selection of a second window; bringing the second window into focus in response to the selection of the second window; gradually dimming at least a visible portion of the first window in response to the selection of the second window; and pausing the dimming, after expiration of a time period, of the at least the visible portion of the first window.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several aspects of the disclosed subject matter are set forth in the following figures.

DETAILED DESCRIPTION

Figure 1:
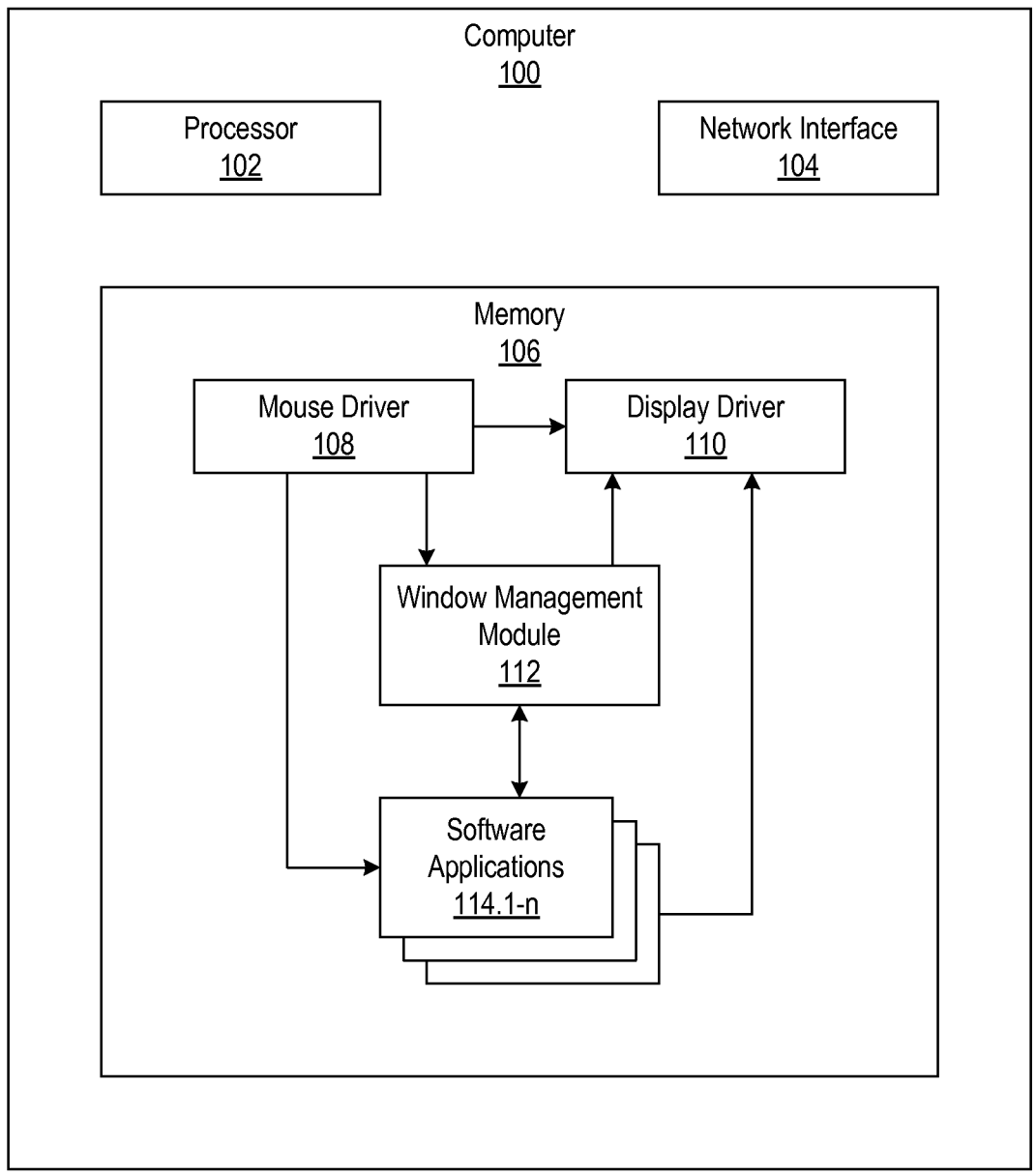
FIG. 1 illustrates an example computer configured to dim a window that is out of focus.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As set forth above, an approach for allowing the user to direct his/her attention to the window that is in focus may be desirable. One way to allow the user to direct his/her attention to the window that is in focus is to make the window that is in focus brighter than the windows that are out of focus, for example, by dimming the windows that are out of focus. When a new window is brought into focus and a window that was previously in focus is brought out of focus, immediately dimming the window that was previously in focus may distract the user. However, a typical user may be less distracted, or not distracted at all, by gradual dimming over time. As the foregoing illustrates, an approach for gradually dimming windows that are out of focus over time may be desirable.

The subject technology is related to gradually dimming a window that is out of focus (e.g., not active) over time. In example aspects, a computer provides for display of a first window and a second window in a user interface (e.g., via the screen of the computer). The first window is in focus (e.g., active) and the second window is not in focus (e.g., not active). The computer receives a user input for bringing the second window into focus. For example, the user may click a mouse on a portion of the display corresponding to the second window or the user may select the second window via a toolbar. The toolbar may be on an edge of the screen, for example, at the bottom of the screen or at the left edge of the screen. The computer brightens the dimmed portion of the second window in response to the user input for bringing the second window into focus. The computer also gradually dims a visible portion of the first window in response to the user input for bringing the second window into focus. In some examples, gradually dimming the visible portion of the first window includes a stepwise dimming of the at least the portion of the first window. The brightening of the portion of the second window may be completed earlier than the dimming of the portion of the first window. For example, the brightening may be completed in 0.5 seconds, while the dimming may be completed in ten seconds. The computer also pauses the dimming, after expiration of a time period (e.g., ten seconds), of the visible portion of the first window. Upon expiration of the time period, the visible portion of the second window appears brighter than the visible portion of the first window.

As used herein, the term "brighten," encompasses its plain and ordinary meaning including, but not limited to, to make lighter or to increase luminosity.

As used herein, the term "dim," encompasses its plain and ordinary meaning including, but not limited to, to make darker or to decrease luminosity.

As used herein, the phrase "stepwise dimming," encompasses its plain and ordinary meaning including, but not limited to, dimming via multiple increments or multiple steps, with each increment or step being more dim than a previous increment or step. The increments or steps may be of constant size or of variable size, where a size of an increment or step refers to a difference between the current increment or step and the previous increment or step.

Advantageously, in some aspects, the subject technology dims a window that is not in focus (e.g., the first window, as described above) on the display in a manner that does not distract the user.

FIG. 1 illustrates an example computer 100 configured to dim a window that is out of focus. The computer 100 may be, for example, a laptop computer, a desktop computer, a netbook, a mobile phone, a tablet computer, a personal digital assistant (PDA), a digital music player, or a television with one or more processors embedded therein or coupled thereto.

As shown, the computer 100 includes a processor 102, a network interface 104, and a memory 106. The processor 102 is configured to execute computer instructions that are stored in a computer-readable medium, for example, the memory 106. The processor 102 may be a central processing unit (CPU). While only one processor 102 is illustrated, the computer 100 may include multiple processors. The network interface 104 is configured to allow the computer 100 to transmit and receive data in a network, e.g., the Internet, a WiFi network, an Ethernet network, or a cellular network. The network interface 104 may include one or more network interface cards (NICs). The memory 106 stores data or instructions. The memory 106 may be one or more of a cache unit, a storage unit, an internal memory unit, or an external memory unit, for example a universal serial bus (USB) memory drive, a compact disk (CD) memory drive, or a digital video disk (DVD) memory drive. As illustrated, the memory 106 includes a mouse driver 108, a display driver 110, a window management module 112, and one or more software applications 114.1-n.

The mouse driver 108 may be coupled with a internal mouse (e.g., on a laptop computer or netbook) or an external mouse (e.g., on a desktop computer). The mouse may be coupled with a cursor displayed on a display of the computer 100, for example, within the display region. The mouse driver 108 is configured to receive mouse movement information and to translate the mouse movement information to cursor movement information to be presented within a display region. The mouse movement information may be provided to the display driver 110, the window management module 112, or the software applications 114.1-n to impact the operations of the display driver 110, the window management module 112, or the software applications 114.1-n. The mouse driver 108 is also configured to receive mouse click information (e.g., left click or right click) or mouse scroll wheel movement information. The mouse click information or mouse scroll wheel movement information may also be provided to the display driver 110, the window management module 112, or the software applications 114.1-n to impact the operations of the display driver 110, the window management module 112, or the software applications 114.1-n. In some aspects, a touch screen having a touch screen driver may be used in addition to or in place of the mouse driver 108 and the corresponding mouse.

The display driver 110 may be coupled with a display (e.g., one or more screens or a projector). The display driver 110 receives information from the mouse driver 108, the window management module 112, or the software applications 114.1-n and provides a display output to the display based on the received information.

The window management module 112 is configured to provide (e.g., via operation of the display driver 110) for display of a first window and a second window in a user interface. The first window is in focus and the second window is not in focus. The window management module 112 is also configured to receive (e.g., via operation of the mouse driver 108) a user input for bringing the second window into focus. The window management module 112 is also configured to brighten (e.g., via operation of the display driver 110) at least a dimmed portion of the second window in response to the user input for bringing the second window into focus. The window management module 112 is also configured to gradually dim, (e.g., via operation of the display driver) a visible portion of the first window in response to the user input for bringing the second window into focus. The brightening of the portion of the second window may finish earlier than the gradually dimming the portion of the first window. For example, the brightening may be completed in 0.5 seconds, while the dimming may be completed in ten seconds. The window management module 112 is also configured to pause the dimming, after expiration of a time period (e.g., ten seconds), of the visible portion of the first window.

The software applications 114.1-*n* may include, for example, a web browser application, a word processor application, a video player application, or an audio file player application. The software applications 114.1-*n* may receive input via the mouse driver 108, among other input sources (e.g., a camera driver or a keyboard driver) and provide output via the display driver 110 among other output sources (e.g., a speaker driver). When instantiated, a specific software application 114.*k* may open one or more windows within the display region. The one or more windows may be managed via operation of the window management module 112.

While each of the drivers 108 and 110, the module 112, and each application 114.*k* is illustrated as a single module, in some implementations, one or more modules may be combined to provide the functionality of the drivers 108 or 110, the module 112, or each application 114.*k*. For example, the module 112 may be divided into two or more sub-modules.

Figure 2A:
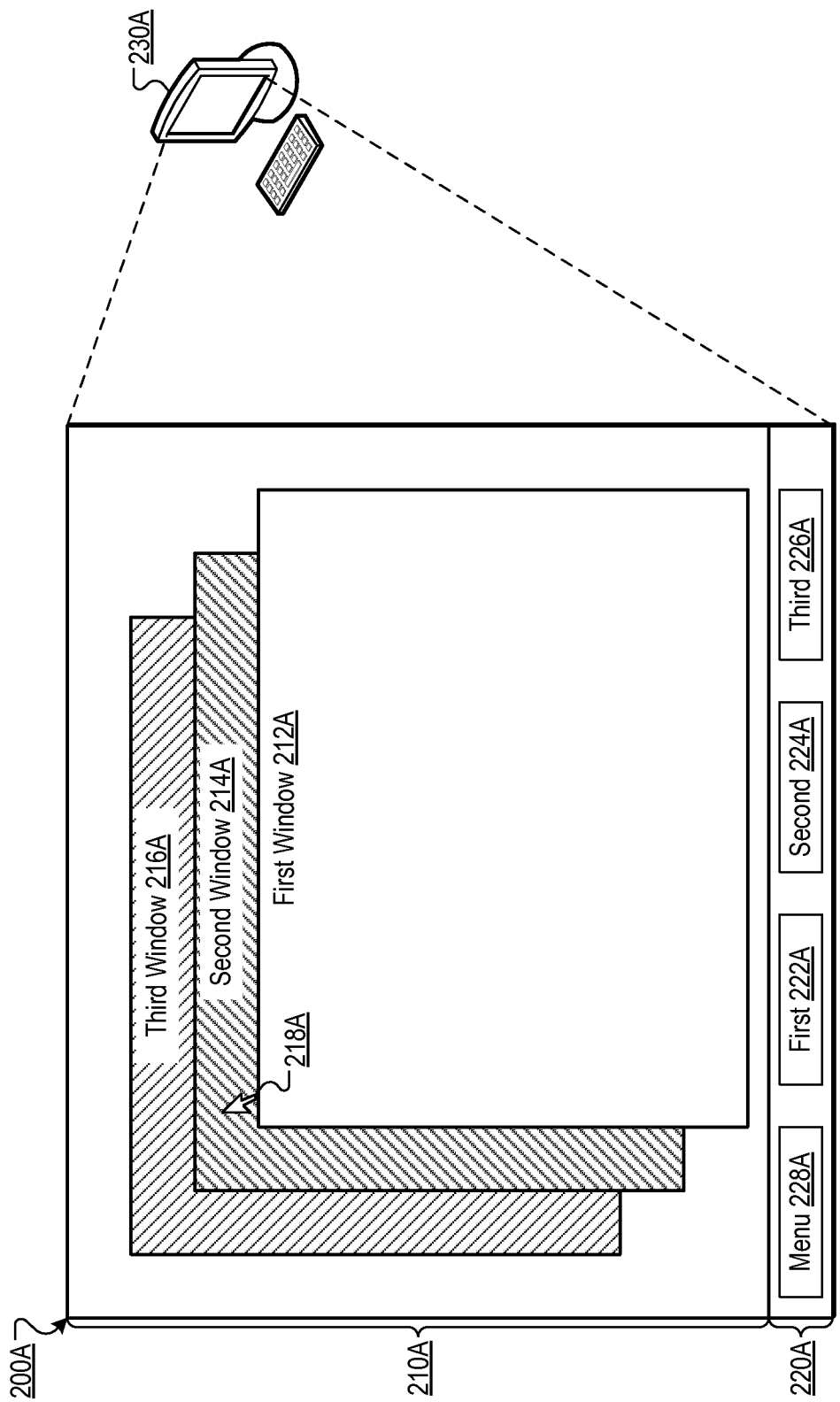
FIGS. 2A-2B illustrates example displays for a computer configured to dim a window that is out of focus.
Figure 2B:
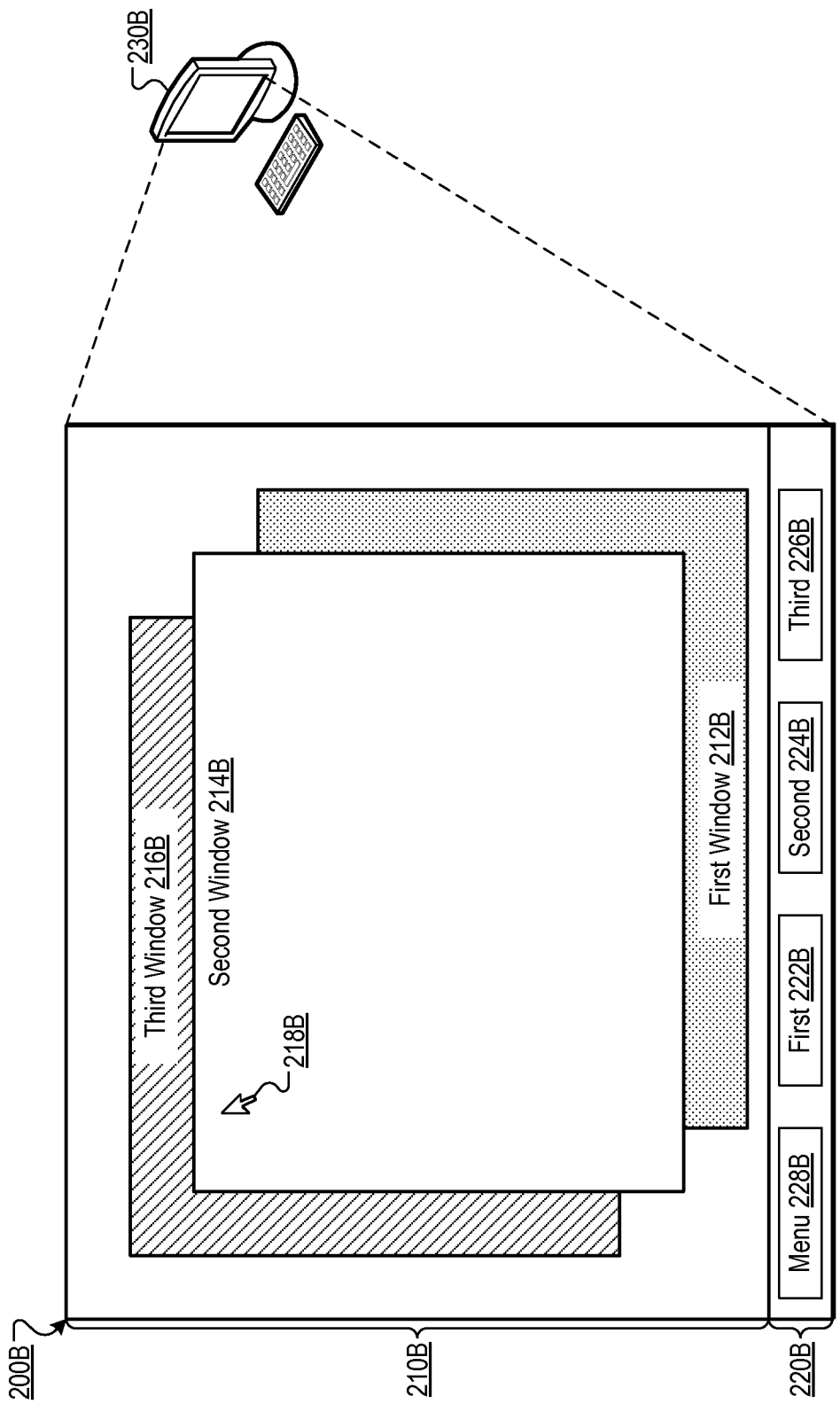

FIGS. 2A-2B illustrates example displays 200A and 200B for a computer configured to dim a window that is out of focus.

FIG. 2A illustrates a display 200A corresponding to a computer screen 230A. In alternative implementations, the display 200A may correspond to two or more screens of a computer or to a display output from a computer. As shown, the display 200A includes a window display region 210A and a toolbar 220A.

The window display region 210A includes three windows: a first window 212A, a second window 214A, and a third window 216A. In alternative implementations, any number of windows, not necessarily three windows, may be used in conjunction with the subject technology. The first window 212A is in focus and brighter than the second window 214A and third window 216A, which are out of focus. The second window 214A and third window 216A are dimmed, as the second window 214A and the third window 216A are out of focus.

The window display region 210A also includes a cursor 218A. As shown, the cursor 218A is hovering over the second window 214A. If the cursor 218A is clicked in its illustrated position, the second window 214A may be selected. As a result of selecting the second window 214A, the second window 214A may be brought into focus and the first window 212A may be brought out of focus, as illustrated in FIG. 2B and described in detail below.

As illustrated, the toolbar 220A is positioned below the window display region 210A. However, in alternative implementations of the subject technology, the toolbar 220A may be positioned to the left, to the right, or above the window display region 210A. The toolbar 220A includes a button corresponding to the first window 222A, a button corresponding to the second window 224A, and a button corresponding to the third window 226A, and a menu button 228A.

The buttons 222A, 224A, and 226A each have corresponding windows 212A, 214A, and 216A, respectively. Each button 222A, 224A, or 226A, when selected, is configured to, if the corresponding window 212A, 214A, or 216A, respectively, is in focus, to bring out of focus and to minimize the corresponding window 212A, 214A, or 216A, respectively, or, if the corresponding window 212A, 214A, or 216A, respectively, is not in focus, to bring into focus the corresponding window 212A, 214A, or 216A, respectively.

The menu button 228A, when selected, is configured to open a menu. The menu may include commands, which may be selected, for instantiating applications or opening or bringing into focus windows (e.g., windows 212A, 214A, or 216A, or additional windows) associated with the applications.

FIG. 2B illustrates a display 200B corresponding to a computer screen 230B. In alternative implementations, the display 200B may correspond to two or more screens of a computer or to a display output from a computer. As shown, the display 200B includes a window display region 210B and a toolbar 220B, similar to the display 200A of FIG. 2A. The display 200B may correspond to the display 200A after the second window 214A/214B has been selected and brought into focus (e.g., via operation of the cursor 218A/218B).

As shown, the window display region 210B includes a first window 212B, a second window 214B, and a third window 216B, corresponding to windows 212A, 214A, and 216A, respectively. In the display 200B, the second window 214B has been brought into focus and the first window 212B has been brought out of focus relative to the display 200A of FIG. 2A, for example, via the user clicking the cursor 218A/218B in its illustrated position. As a result, the second window 214B is placed in front of the first window 212B. The second window 214B is also brightened relative to the brightness of the second window 214A of FIG. 2A. The first window 212B is placed behind the second window 214B and dimmed relative to the brightness of the first window 212A of FIG. 2A. However, the first window 212B may be dimmed to a brightness level that is more bright than a brightness level of the third window 216B to indicate that the first window 212B was recently brought into focus.

The toolbar 220B includes a button corresponding to the first window 222B, a button corresponding to the second window 224B, and a button corresponding to the third window 226B, and a menu button 228B. The toolbar 220B and the buttons 222B, 224B, 226B, and 228B in the toolbar function similarly to the toolbar 220A an the buttons 222A, 224A, 226A, and 228A of FIG. 2A.

FIGS. 2A-2B illustrate some aspects of the subject technology. In additional aspects, no toolbar 200A/200B may be provided, no third window 216A/216B may be provided, or no second window 214A may be provided in the first display (e.g., the second window may be created by opening a new software program, for example, by selecting an icon or a button within the menu 228A).

Figure 3:
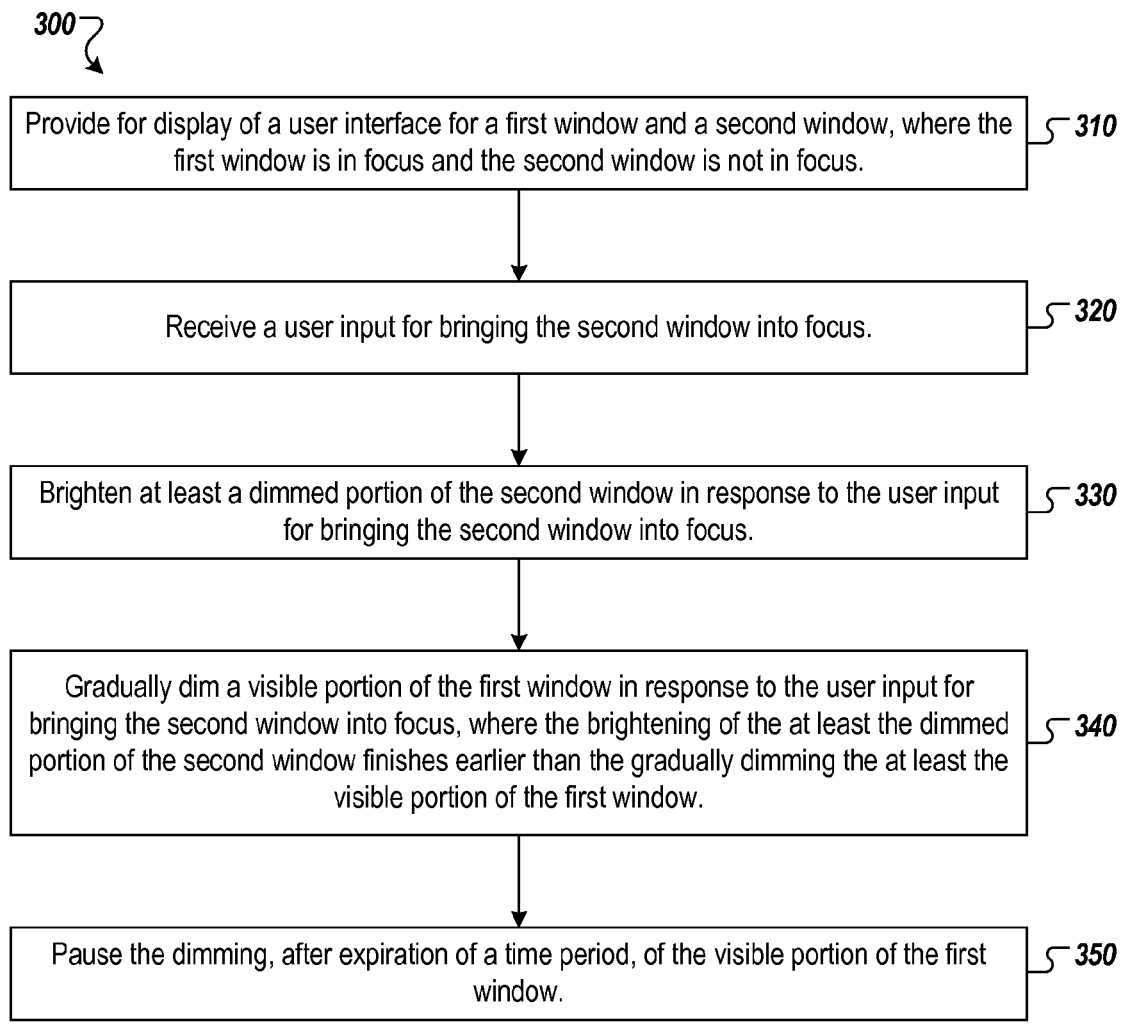
FIG. 3 illustrates an example process by which a window that is out of focus may be dimmed.

FIG. 3 illustrates an example process 300 by which a window that is not in focus may be dimmed.

The process 300 begins at step 310, where a computer (e.g., computer 100, via operation of the window management module 112) provides for display of a user interface (e.g., display 200A) for a first window (e.g., first window 212A) and a second window (e.g., second window 214A). The first window is in focus and the second window not in focus. In some examples, the second window may not be open within the user interface. The first window is displayed within the user interface.

In step 320, the computer receives a user input for bringing the second window into focus. For example, the user may select (e.g., via operation of a mouse) the second window or a button on a toolbar (e.g., toolbar 220A) corresponding to the second window. In some examples, the user may request to open the second window via an icon within the user interface or via a menu (e.g., a menu corresponding to menu button 228A). The computer brings the second window into focus in response to the user input for bringing the second window into focus.

In step 330, the computer brightens, at least a dimmed portion of the second window in response to the user input for bringing the second window into focus. The brightening may be completed, for example, within 0.5 seconds. If the second window is not open within the user interface, the computer may open the second window instead of brightening the second window.

In step 340, the computer gradually dims a visible portion of the first window or the entire first window in response to the user input for bringing the second window into focus. The brightening of the dimmed portion of the second window may finish earlier than the gradually dimming the visible portion of the first window. For example, the brightening may finish in 0.5 seconds, while the dimming may take longer than three seconds. In some aspects, the dimming takes between nine and eleven seconds.

In some aspects, the computer may dim the visible portion of the first window via multiple increments or multiple steps, with the visible portion of the first window being more dim at each increment than at a previous increment. The increments or steps may be of constant size or of variable size, where a size of an increment refers to a difference in brightness (e.g., measured in lumens or as a percentage of a maximum screen brightness) between the current increment or step and the previous increment or step. In other words, gradually dimming the visible portion of the first window may include a stepwise dimming or an incremental dimming of the visible portion of the first window.

In some aspects, the entire visible portion of the first window may be dimmed. In another aspect, only a part of the visible portion of the first window may be dimmed. For example, only the title bar, or the title bar and other contents of the first window may be dimmed. In addition, the title bar of the first window may also be made more opaque or less opaque or the contents of the first window or the title bar may be blurred. Making the title bar of the first window more opaque or blurring the contents of the first window or the title bar may occur in parallel with gradually dimming the portion of the first window of step 340.

In step 350, the computer pauses or stops the dimming, after expiration of the time period, of the visible portion of the first window or the entire first window. Upon pausing the dimming, the first window may be dimmed by a certain percentage from its original brightness (when the first window was in focus). The certain percentage, may be, for example 10%, 20%, 30%, or 40%. In some aspects, the first window is not completely dimmed upon expiration of the time period.

In some aspects, the computer may determine that a size (e.g., a length or a width at one point of the visible portion of the first window) of the visible portion of the first window is less than a threshold size (e.g., thirty pixels or 0.25 inches). The computer may forego bringing the first window into focus in response to a mouse click within the visible portion of the first window based on the visible portion of the first window being less than the threshold size. The user may select the first window via a button on the toolbar (e.g., button 222B on toolbar 220B).

Upon pausing dimming the visible portion of the first window, the visible portion of the first window may be at a first brightness level (e.g., measured in lumens or as a proportion of a maximum screen brightness). Upon completion of brightening the dimmed portion of the second window, the dimmed portion of the second window may be at a second brightness level. The first brightness level may be a percentage between 1% and 99% of the second brightness level. In one example, the percentage is between 70% and 95%. The percentage may be determined based on the size (e.g., a length or a width at one point of the visible portion of the first window) of the visible portion of the first window. For example, the smaller the size of the visible portion of the first window, the less bright the first window may be. The percentage may be determined based on whether the first window overlaps the second window. (E.g., the first window may be less bright if the first window overlaps the second window.)

If there is a third window in the user interface, the third window may be associated with a third brightness level. The third brightness level may be less than the first brightness level. For example, the second brightness level may be 100% of the maximum brightness of the screen. The first brightness level may be 90% of the maximum brightness of the screen. The third brightness level may be 80% of the maximum brightness of the screen. Alternatively, the third brightness level may be equal to the first brightness level (e.g., both the first brightness level and the third brightness level may be 85% of the maximum brightness of the screen). After step 350, the process 300 ends.

In some implementations, instructions for implementing the steps 310-350 in the process 300 may be stored in a memory of a computer (e.g., in the window management module 112) and may be implemented by the computer. The steps 310-350 in the process 300 may be carried out in series. Alternatively, two or more of the steps 310-350 in the process 300 may be carried out in parallel. For example, steps 330 and 340 may be carried out in parallel.

Figure 4:
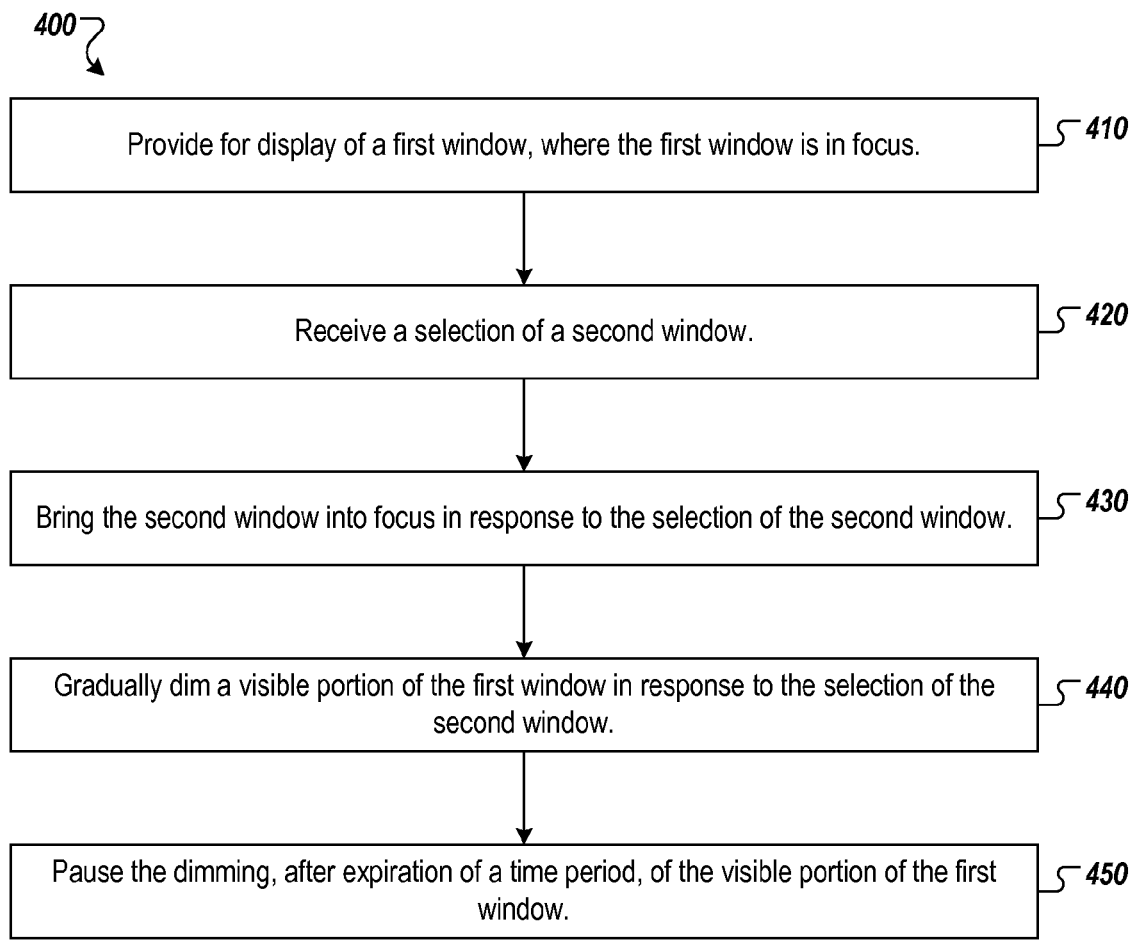
FIG. 4 illustrates an example process by which a window may be brought into focus.

FIG. 4 illustrates an example process 400 by which a window may be brought into focus.

The process 400 begins at step 410, where a computer (e.g., computer 100, via operation of the window management module 112) provides for display of a first window, where the first window is in focus.

In step 420, the computer receives a selection of a second window. The second window may already be displayed on the computer and may be a window that is not in focus. Alternatively, the selection of the second window may include an instantiation of an application (e.g., a web browser or an email client) that creates the second window or an opening of a new window within an open application (e.g., viewing an email message in a new window of an email client).

In step 430, the computer brings the second window into focus in response to the selection of the second window. The computer also brings the first window out of focus. In some aspects, only one window at a time may be in focus.

In step 440, the computer gradually dims a visible portion of the first window or the entire first window in response to the selection of the second window.

In step 450, the computer pauses the dimming, after expiration of a time period, of the visible portion of the first window or the entire first window. Upon pausing the dimming, the first window may be dimmed by a certain percentage from its original brightness (when the first window was in focus). The certain percentage, may be, for example 10%, 20%, 30%, or 40%. After step 450, the process 400 ends.

In some implementations, instructions for implementing the steps 410-450 in the process 400 may be stored in a memory of a computer (e.g., in the window management module 112) and may be implemented by the computer. The steps 410-450 in the process 400 may be carried out in series. Alternatively, two or more of the steps 410-450 in the process 400 may be carried out in parallel. For example, steps 430 and 440 may be carried out in parallel.

The subject technology is described above in conjunction with a visible portion of the first window. However, any other portion of the first window (e.g., a title bar of the first window, a region of the first window excluding the title bar, the entire first window, etc.) may be used in place of the visible portion of the first window.

Figure 5:
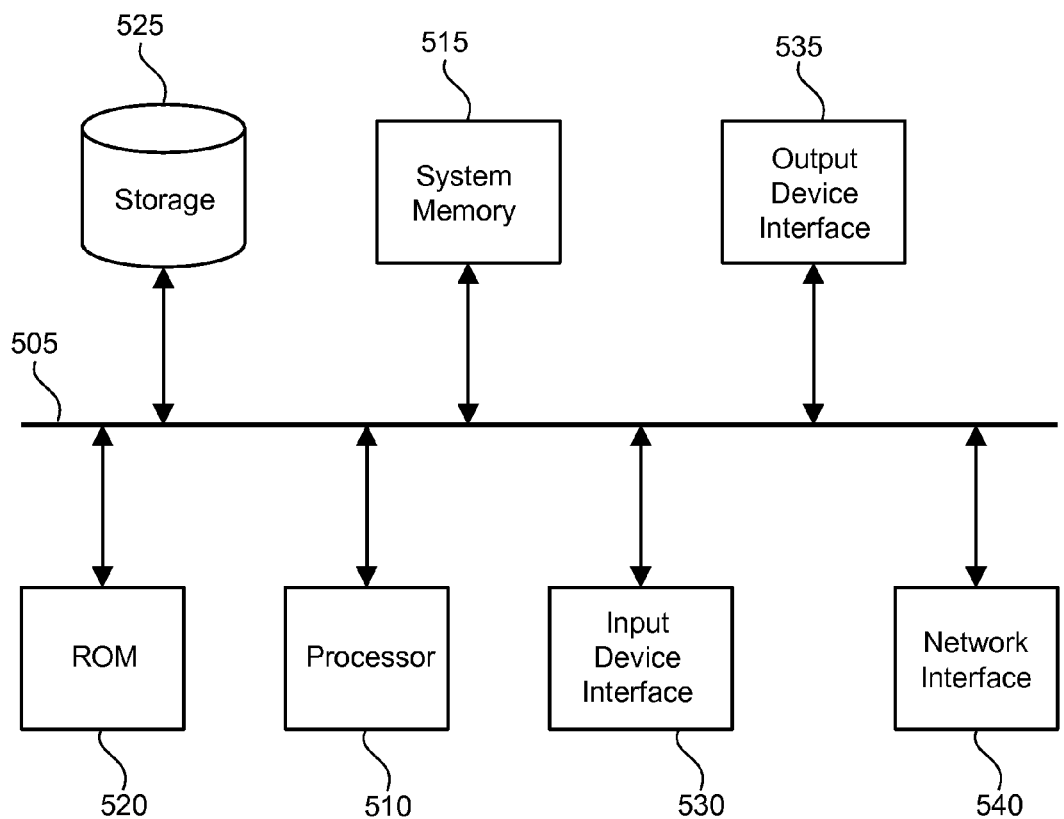
FIG. 5 conceptually illustrates an example electronic system with which some implementations of the subject technology are implemented.

FIG. 5 conceptually illustrates an electronic system 500 with which some implementations of the subject technology are implemented. For example, the computer 100 may be implemented using the arrangement of the electronic system 500. The electronic system 500 can be a computer (e.g., a mobile phone, PDA), or any other sort of electronic device. Such an electronic system includes various types of computer readable media and interfaces for various other types of computer readable media. Electronic system 500 includes a bus 505, processing unit(s) 510, a system memory 515, a read-only memory 520, a permanent storage device 525, an input device interface 530, an output device interface 535, and a network interface 540.

The bus 505 collectively represents all system, peripheral, and chipset buses that communicatively connect the numerous internal devices of the electronic system 500. For instance, the bus 505 communicatively connects the processing unit(s) 510 with the read-only memory 520, the system memory 515, and the permanent storage device 525.

From these various memory units, the processing unit(s) 510 retrieves instructions to execute and data to process in order to execute the processes of the subject technology. The processing unit(s) can be a single processor or a multi-core processor in different implementations.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some implementations of the subject technology use a mass-storage device (for example a magnetic or optical disk and its corresponding disk drive) as the permanent storage device 525.

Other implementations use a removable storage device (for example a floppy disk, flash drive, and its corresponding disk drive) as the permanent storage device 525. Like the permanent storage device 525, the system memory 515 is a read-and-write memory device. However, unlike storage device 525, the system memory 515 is a volatile read-and-write memory, such a random access memory. The system memory 515 stores some of the instructions and data that the processor needs at runtime. In some implementations, the processes of the subject technology are stored in the system memory 515, the permanent storage device 525, or the read-only memory 520. For example, the various memory units include instructions for dimming a window that is out of focus in accordance with some implementations. From these various memory units, the processing unit(s) 510 retrieves instructions to execute and data to process in order to execute the processes of some implementations.

The bus 505 also connects to the input and output device interfaces 530 and 535. The input device interface 530 enables the user to communicate information and select commands to the electronic system. Input devices used with input device interface 530 include, for example, alphanumeric keyboards and pointing devices (also called "cursor control devices"). Output device interfaces 535 enables, for example, the display of images generated by the electronic system 500. Output devices used with output device interface 535 include, for example, printers and display devices, for example cathode ray tubes (CRT) or liquid crystal displays (LCD). Some implementations include devices for example a touchscreen that functions as both input and output devices.

Finally, as shown in FIG. 5, bus 505 also couples electronic system 500 to a network (not shown) through a network interface 540. In this manner, the electronic system 500 can be a part of a network of computers (for example a local area network ("LAN"), a wide area network ("WAN"), or an Intranet, or a network of networks, for example the Internet. Any or all components of electronic system 500 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD- R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for bringing a window into focus, the method comprising:

providing for display of a first window and a second window in a user interface, wherein the first window is in focus, and wherein the second window is not in focus;

receiving a user input for bringing the second window into focus;

brightening at least a dimmed portion of the second window in response to the user input for bringing the second window into focus;

gradually dimming at least a portion of the first window in response to the user input for bringing the second window into focus, wherein the brightening of the at least the dimmed portion of the second window finishes earlier than the gradually dimming the at least the portion of the first window;

pausing the dimming, after expiration of a time period, of the at least the portion of the first window;

determining that a size of the portion of the first window is less than a threshold size; and foregoing bringing the first window into focus in response to a mouse click within the portion of the first window based on the portion of the first window being less than the threshold size.

2. The method of claim 1, wherein the time period exceeds three seconds.

3. The method of claim 1, wherein the time period is between nine seconds and eleven seconds.

4. The method of claim 1, wherein the brightening of the at least the dimmed portion of the second window finishes in 0.5 seconds.

5. The method of claim 1, wherein upon pausing the dimming of the at least the portion of the first window, the at least the portion of the first window is at a first brightness level, wherein upon completion of brightening the at least the dimmed portion of the second window, the at least the dimmed portion of the second window is at a second brightness level, and wherein the first brightness level is a percentage of the second brightness level.

6. The method of claim 5, further comprising:
determining the percentage based on a size of the portion of the first window.

7. The method of claim 5, further comprising:
determining the percentage based on whether the first window overlaps the second window.

8. The method of claim 5, wherein a third window in the user interface is dimmed to a third brightness level, and wherein the third brightness level is less bright than the second brightness level.

9. The method of claim 5, wherein the percentage is between 70% and 95%.

10. The method of claim 1, wherein the at least the portion of the first window comprises at least a visible portion of the first window.

11. The method of claim 1, wherein the at least the portion of the first window comprises a title bar of the first window.

12. The method of claim 1, further comprising:
adjusting an opacity of a title bar of the first window.

13. The method of claim 12, wherein adjusting the opacity of the title bar occurs in parallel with gradually dimming the at least the portion of the first window.

14. The method of claim 1, further comprising:
blurring contents of the at least the portion of the first window.

15. The method of claim 14, wherein blurring the contents of the at least the portion of the first window occurs in parallel with gradually dimming of the at least the portion of the first window.

16. The method of claim 1, wherein gradually dimming the at least a portion of the first window comprises a stepwise dimming of the at least the portion of the first window.

17. A non-transitory computer-readable medium for bringing a window into focus, the computer-readable medium comprising instructions which, when executed by a computer, cause the computer to:
receive, within a user interface in which a first window is in focus and a second window is not in focus, a user input for bringing the second window into focus;
brighten at least a dimmed portion of the second window in response to the user input for bringing the second window into focus;
gradually dim at least a visible portion of the first window in response to the user input for bringing the second window into focus, wherein the instructions to brighten the at least the dimmed portion of the second window finish execution earlier than the instructions to gradually dim the at least the visible portion of the first window;
pause the dimming, after expiration of a time period, of the at least the visible portion of the first window;
determine that a size of the visible portion of the first window is less than a threshold size; and
forego bringing the first window into focus in response to a mouse click within the visible portion of the first window based on the visible portion of the first window being less than the threshold size.

18. The non-transitory computer-readable medium claim 17, wherein the time period exceeds three seconds.

19. The non-transitory computer-readable medium claim 17, wherein the time period is between nine seconds and eleven seconds.

20. The non-transitory computer-readable medium claim 17, wherein the brightening of the at least the dimmed portion of the second window finishes in 0.5 seconds.

21. The non-transitory computer-readable medium claim 17, wherein upon pausing the dimming of the at least the visible portion of the first window, the at least the visible portion of the first window is at a first brightness level, wherein upon completion of brightening the at least the dimmed portion of the second window, the at least the dimmed portion of the second window is at a second brightness level, and wherein the first brightness level is a percentage of the second brightness level.

22. The non-transitory computer-readable medium of claim 21, further comprising instructions which, when executed by the computer, cause the computer to:
determine the percentage based on a size of the visible portion of the first window.

23. The non-transitory computer-readable medium claim 21, further comprising instructions which, when executed by the computer, cause the computer to:
determine the percentage based on whether the first window overlaps the second window.

24. The non-transitory computer-readable medium claim 21, wherein a third window in the user interface is dimmed to a third brightness level, and wherein the third brightness level is less bright than the second brightness level.

25. The non-transitory computer-readable medium claim 21, wherein the percentage is between 70% and 95%.

26. A system for bringing a window into focus, the system comprising:
one or more processors; and
a memory comprising instructions which, when executed by the one or more processors, cause the one or more processors to:
provide for display of a first window, wherein the first window is in focus;
receive a selection of a second window;
bring the second window into focus in response to the selection of the second window;
gradually dim at least a visible portion of the first window in response to the selection of the second window;
pause the dimming, after expiration of a time period, of the at least the visible portion of the first window;
determine that a size of the visible portion of the first window is less than a threshold size; and
forego bringing the first window into focus in response to a mouse click within the visible portion of the first window based on the visible portion of the first window being less than the threshold size.

* * * * *